United States Patent Office 2,846,487
Patented Aug. 5, 1958

2,846,487
PROCESS FOR THE MANUFACTURE OF CAROTENOIDS

Otto Isler, Marc Montavon, and Rudolf Rüegg, Basel, and Paul Zeller, Neuallschwil, near Basel, Switzerland, assignors to Hoffmann-La Roche Inc., Nutley, N. J., a corporation of New Jersey No Drawing. Application July 13, 1956
Serial No. 597,586

Claims priority, application Switzerland July 20, 1955

14 Claims. (Cl. 260—666)

The present invention relates to a process for the manufacture of carotenoids. This process comprises condensing acetylene at both ends by a metal-organic reaction with a $C_{19}$-aldehyde having the general formula:

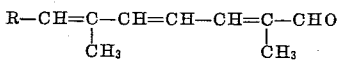

wherein R represents a hydrocarbon radical having the carbon skeleton of geraniol or cyclogeraniol, hydrolysing the resulting metal-organic condensation product, and treating the resulting $C_{40}$-diol with excess lithium-aluminium hydride.

The $C_{19}$-aldehydes used as starting materials can be prepared, e. g., according to the method described in Helvetica Chimica Acta, volume 39, pages 249 and 259 [1956]. The preparation of these $C_{19}$-aldehydes is further disclosed by the following survey.

8 - [2,6,6 - trimethyl - cyclohexen - (1) - yl] - 2,6 - dimethyl-octatrien-(2,4,6)-al-(1) (referred to as $\beta$-$C_{19}$-aldehyde hereinafter):

4 - [2,6,6 - trimethyl - cyclohexen - (1) - yl] - 2-methyl-buten-(2)-al-(1) (=$\beta$-$C_{14}$-aldehyde) is condensed by a Grignard reaction with 2-methyl-2-hydroxy-butyne-(3)-al-(1)-diethyl acetal obtainable by condensation of 1,1-diethoxy-propanone-(2) with lithium acetylide, the formed condensation product is heated with excess lithium-aluminium hydride, and the obtained 8-[2,6,6-trimethyl - cyclohexen - (1) - yl] - 2,6 - dimethyl - octatrien-(2,4,6)-al-(1)-diethyl acetal is hydrolysed with acid.

8 - [2,6,6 - trimethyl - cyclohexen - (2) - yliden] - 2,6-dimethyl-octatrien-(2,4,6)-al-(1) (referred to as dehydro-(retro)-$C_{19}$-aldehyde hereinafter):

The above compound is prepared from analogy to the $\beta$ - $C_{19}$ - aldehyde from 4 - [2,6,6 - trimethyl - cyclohexen - (2) - yliden] - 2 - methyl - buten - (2) - al - (1) - (=dehydro-(retro)-$C_{14}$-aldehyde) which is obtainable by treatment of the $\beta$-$C_{14}$-aldehyde with N-bromosuccinimide and subsequent heating with quinoline.

8 - [2,6,6 - trimethyl - cyclohexadien - (1,3) - yl] - 2,6-dimethyl-octatrien-(2,4,6)-al-(1) (referred to as dehydro-$\beta$-$C_{19}$-aldehyde hereinafter):

This compound is prepared from analogy to the $\beta$-$C_{19}$-aldehyde from 4 - [2,6,6 - trimethyl - cyclohexadien-(1,3 - yl] - 2 - methyl - buten - (2) -al - (1) - (=dehydro-$\beta$-$C_{14}$-aldehyde) which is obtainable by treatment of the dehydro-(retro)-$C_{14}$-aldehyde with isopropenyl acetate and subsequent mild saponification of the resulting 4-[2,6,6 - trimethyl - cyclohexadien - (1,3) - yl] - 2 - methyl-1-acetoxy-butadiene-(1,3).

8 - [2,6,6 - trimethyl - cyclohexylidene] - 2,6 - dimethyl-octatrien-(2,4,6)-al-(1) (referred to as iso-$C_{19}$-aldehyde hereinafter):

This compound is prepared from analogy to the $\beta$-$C_{19}$-aldehyde from 4 - [2,6,6 - trimethyl - cyclohexylidene]-2 - methyl - buten - (2) - al - (1) (iso - $C_{14}$ - aldehyde) which may be obtained as follows: The ethoxy-acetylene carbinol resulting from the condensation of ethoxy-acetylene with 2,6,6-trimethyl-cyclohexanone-(1) is partially hydrogenated at the triple bond in a manner known per se and treated with acid. The resulting 2,6,6-trimethyl-cyclohexylidene-acetaldehyde is acetalised, the resulting acetal is condensed with a propenyl ether in the presence of an acidic condensing agent, and the condensation product is treated with acid.

2,6,10,14 - tetramethyl - pentadecapentaen - (2,4,6,8, 13)-al-(1) (referred to as pseudo-$C_{19}$-aldehyde hereinafter):

This compound is prepared from analogy to the $\beta$-$C_{19}$-aldehyde from 2,6,10-trimethyl-undecatrien-(2,4,9)-al-(1) (=pseudo-$C_{14}$-aldehyde) which is obtainable from pseudo ionone and ethyl chloroacetate by a glycide ester synthesis and subsequent treatment of the resulting glycide ester with alkali.

In the first step of the process of the present invention acetylene is condensed at both ends with the $C_{19}$-aldehyde by a metal-organic reaction. To this end, acetylene-di-magnesium halides can be condensed with the double molar amount of the $C_{19}$-aldehyde by a Grignard reaction. The acetylene di-magnesium halides can be prepared in a manner known per se by the action of acetylene on a solution of alkyl-magnesium halide in an inert solvent. To this end, an ethereal solution of the alkyl-magnesium halide is conveniently stirred or shaken for several hours in an acetylene atmosphere. Alkyl-magnesium halides, which may be used comprise, e. g., ethyl-, butyl- and hexyl-magnesium bromides and chlorides, respectively. The acetylene di-magnesium halides separate in the form of heavy oils or solids. A suitable mode of operation consists in dissolving 2 moles of $\beta$- or dehyro-$\beta$- or iso- or dehydro-(retro)- or pseudo-$C_{19}$-aldehyde in an inert solvent, such as diethyl ether, adding the solution, while stirring vigorously, to the acetylene di-magnesium halide suspension, and stirring the mixture for several hours at room temperature or at the boiling temeperature of the solvent. Hydrolysis of the condensation product yields 1,18-di-[2,6,6-trimethyl-cyclohexen-(1)-yl]- or 1,18-di-[2,6,6-trimethyl-cyclohexadien-(1,3)-yl]- or 1,18-di-[2,6,6-trimethyl-cyclohexylidene]- or 1,18-di-[2,6,6-trimethyl - cyclohexen - (2) - ylidene]- or 1,18-di-[2,6-dimethyl - hepten - (5) - ylidene] - 3,7,12,16-tetramethyl-8,11 - dihydroxy - octadecahexaen - (2,4,6,12,14,16)-yne-(9), referred to as $\beta$- or bisdehydro-$\beta$- or iso- or bisdehydro-(retro)- or pseudo-$C_{40}$-diol hereinafter.

In a further mode of carrying out the first reaction step the $\beta$- or dehydro-$\beta$- or iso- or dehydro-(retro)- or pseudo-$C_{19}$-aldehyde is first reacted with an alkali or alkaline earth metal acetylide in liquid ammonia and the condensation product, preferably after having been hydrolysed to the corresponding acetylene carbinol, is condensed with 1 mole of $\beta$- or dehydro-$\beta$- or iso- or dehydro-(retro)- or pseudo-$C_{19}$-aldehyde by a metal-organic reaction. The condensation of the $C_{19}$-aldehyde with the metal acetylide in liquid ammonia can be carried out at elevated pressure at room temperature or at normal atmospheric pressure at the boiling temperature of ammonia. Lithium acetylide is preferably used for the condensation. The $C_{19}$-aldehyde can be added in an inert solvent, such as diethyl ether. The condensation product can be hydrolysed by the addition of an ammonium salt prior to the removal of the ammonia or by the addition of acid after the removal of the ammonia. There is thus obtained 10 - [2,6,6 - trimethyl - cyclohexen - (1) - yl] - or 10-[2,6,6-trimethyl-cyclohexadien-(1,3)-yl]- or 10-[2,6,6-trimethyl-cyclohexylidene]- or 10-[2,6,6-trimethyl-cyclohexen-(2)-ylidene]- or 10[2,6-dimethyl-hepten-(5)-ylidene] - 4,8 - dimethyl - decatrien - (4,6,8) - yne - (1) - ol-(3) (hereinafter referred to as $\beta$- or dehydro-$\beta$- or iso- or dehydro-(retro)- or pseudo-$C_{21}$-acetylene carbinol).

The $C_{21}$-acetylene carbinols are viscous oils which have 1 mole of active hydrogen atoms in the cold and 2 moles of active hydrogen atoms at elevated temperature as determined by the method of Zerewitinoff. They show characteristic absorption maxima in the ultra-violet spectrum. The $C_{21}$-acetylene carbinols are condensed with 1 mole of β- or dehydro-β- or iso- or dehydro-(retro), or pseudo-$C_{19}$-aldehyde by a metal-organic reaction. The preferred mode of operation consists in subjecting the $C_{21}$-acetylene carbinol to the action of 2 moles of alkyl-magnesium halide in ether. The first mole of the alkyl-magnesium halide is attached to the hydroxyl group whereas the second mole reacts with the acetylene bond, the terminal carbon atom being thus adapted for condensation. The resulting di-magnesium halide compound is reacted with the $C_{19}$-aldehyde, conveniently in the same solvent. The condensation product is hydrolysed in a known manner, conveniently without any purification, e. g. by pouring it onto a mixture of ice and dilute sulphuric acid. If the $C_{19}$-aldehyde used for the condensation is the same as in the preparation of the $C_{21}$-acetylene carbinol, there are obtained the symmetrical β-, bisdehydro-β-, iso-, bisdehydro-(retro)- and pseudo-$C_{40}$-diols mentioned above. If the $C_{21}$-acetylene carbinol is condensed with a different $C_{19}$-aldehyde, there are obtained asymmetrical $C_{40}$-diols, e. g. 1 - [2,6,6 - trimethyl - cyclohexen - (1) - yl] - 18 - [2,6,6 - trimethyl - cyclohexadien - (1,3) - yl] - 3,7,12,16-tetramethyl - 8,11 - dihydroxy - octadecahexaen - (2,4,6,-12,13,16)-yne-(9) (hereinafter referred to as dyhydro-β-$C_{40}$-diol) from β-$C_{21}$-acetylene carbinol and dehydro-β-$C_{19}$-aldehyde, or from dehydro-β-$C_{21}$-acetylene carbinol and β-$C_{19}$-aldehyde, etc.

The thus obtained $C_{40}$-diols have 2 moles of active hydrogen atoms as determined by the method of Zerewitinoff and show characteristic absorption maxima in the ultra-violet spectrum.

In the final step of the process of the present invention the $C_{40}$-diols are treated with excess lithium-aluminium hydride. In this reaction the triple bond is partially hydrogenated, and —surprisingly—the hydroxyl groups are simultaneously eliminated with formation of a new double bond. In the present process the partial hydrogenation and the elimination of the hydroxyl groups take place simultaneously if the $C_{40}$-diol is treated in an inert solvent with excess lithium-aluminium hydride at room temperature or at elevated temperature. Solvents which may be used for this purpose include aliphatic or cyclic ethers, such as diethyl ether, ethylene glycol dimethyl ether or dioxane, and organic tertiary amines, such as N,N-diethylaniline or N-ethyl-morpholine. In order to avoid losses of substance due to oxidation it is advisable to operate in an inert atmosphere. In the preferred mode of operation the $C_{40}$-diol is stirred in N,N-diethyl aniline with 2–4 moles of lithium-aluminium hydride in a nitrogen atmosphere at 50–80° C. There is thus obtained 7,7-dihydro-β-carotene from the β-$C_{40}$-diol; 3,4-3,4-bisdehydro-7,7-dihydro-β-carotene from bis-dehydro-β-$C_{40}$-diol; 5,5-dihydro-β-carotene from iso-$C_{40}$-diol; 4,4-dehydro-β-carotene from bisdehydro-(retro)-$C_{40}$-diol; and 5,5-dihydro-lycopene from pseudo-$C_{40}$-diol. From the asymmetric $C_{40}$-diols there are obtained asymmetric carotene compounds, such as 3,4-dehydro-7,7-dihydro-β-carotene from dehydro-β-$C_{40}$-diol.

The obtained carotenoids can be purified by crystallisation, distribution between solvents or chromatography. They possess characteristic absorption maxima in the ultaviolet spectrum. They can be stabilised by the addition of antioxidants which may be present also throughout the synthesis. The products of the present process are valuable coloring agents for foodstuffs and feedstuffs. Thus they may be employed for imparting a yellowish-orange color to foodstuffs, such as, e. g., butter, cheese and margarine.

The invention will now be illustrated in the following examples without being limited thereto.

*Example 1*

A solution of hexyl-magnesium bromide was prepared from 1 g. of magnesium and 6.6 g. of hexyl bromide in 20 ml. of absolute ether. The solution was stirred for 24 hours in an acetylene atmosphere. Two layers formed. The upper layer was separated, and the lower layer was washed once with 8 ml. of absolute ether. Then 12 ml. of absolute ether were added, and to the mixture there was rapidly added a solution of 4.8 g. of 8-[2,6,6-trimethyl - cyclohexen - (1) - yl] - 2,6 - dimethyl - octatrien-(2,4,6)-al-(1) in 12 ml. of dry ether. The mixture was refluxed for 3 hours in a nitrogen atmosphere. After cooling, it was poured onto a mixture of 15 ml. of 3 N sulphuric acid and 20 g. of ice, and the whole was vigorously stirred for 5 minutes. The separated ether solution was washed successively with water and 5% sodium bicarbonate solution and dried over sodium sulphate. The ether was evaporated to obtain 5.2 g. of 1,18-di-[2,6,6-trimethyl-cyclohexen-(1)-yl]-3,7,12,16 - tetramethyl - 8,11-dihydroxy - octadecahexaen - (2,4,6,12,14,16) - yne - (9) which can be further reacted without any preliminary purification. By recrystallisation from petroleum ether this product can be obtained in the form of colorless crystals which show absorption maxima in the U. V. spectrum at 281.5 and 293 mμ in petroleum ether.

5.6 g. of 1,18-di-[2,6,6-trimethyl-cyclohexen-(1)-yl]-3,7,12,16-tetramethyl-8,11 - dihydroxy - octadecahexaen-(2,4,6,12,14,16)-yne-(9) were suspended in 140 ml. of N,N-diethyl aniline. A solution of 1.2 g. of lithium-aluminium hydride in 30 ml. of absolute ether was gradually added to the suspension, while stirring, at 10–15° C., and the mixture was heated for 3 hours at 60° C. in a nitrogen atmosphere. The reaction mixture was then poured onto a mixture of 250 ml. of 3 N sulphuric acid and 200 g. of ice and extracted with ether. The ether solution was successively washed with ice-cold 3 N sulphuric acid, water and 5% sodium bicarbonate solution, then dried over sodium sulphate and concentrated. The residue was purified by crystallisation from methylene chloride-methanol. There were thus obtained 5 g. of 7,7-dihydro-β-carotene in the form of orange-colored crystals of M. P. 183–184° C.; U. V. absorption maxima at 382.5, 404 and 429 mμ in petroleum ether.

*Example 2*

Dry acetone-free acetylene was passed into a solution of 1 g. of lithium in 400 ml. of liquid ammonia until the lithium had completely reacted. Then a solution of 33 g. of 8-[2,6,6-trimethyl-cyclohexen-(1)-yl]-2,6-dimethyl-octatrien-(2,4,6)-al-(1) in 120 ml. of dry ether was added to the obtained solution within 20 minutes, while stirring vigorously, and the reaction mixture was thoroughly stirred for 20 hours with exclusion of humidity. Then, 16 g. of ammonium chloride were added to the reaction mixture in small portions, and the ammonia was allowed to evaporate. After addition of 120 ml. of water, the ether layer was separated, washed with water, dried over sodium sulphate and concentrated. The residual reddish oil was sharply dried in vacuo. There were thus obtained 35.6 g. of 10-[2,6,6-trimethyl-cyclohexen-(1)-yl]-4,8-dimethyl-decatrien-(4,6,8)-yne-(1)-ol-(3); U. V. absorption maxima at 280.5 and 291 mμ in petroleum ether.

The product obtained as described in the foregoing paragraph was dissolved in 160 ml. of absolute ether, and the solution was gradually added at 15–20° C., while stirring, to an ethyl-magnesium bromide solution prepared from 6 g. of magnesium, 30 g. of ethyl bromide and 100 ml. of absolute ether. The mixture was refluxed for one hour in a nitrogen atmosphere. The reaction mixture was then cooled with ice water, and there was added at about 20° C. a solution of 30.6 g. of 8-[2,6,6-trimethyl-cyclohexen-(1)-yl]-2,6-dimethyl-octatrien-(2,4,6)-al-(1) in 130 ml. of dry ether. The mixture was refluxed for 3–4 hours in a nitrogen atmosphere. The reaction solution was then poured onto a mixture of 130 ml. of 3 N sulphuric acid and 200 g. of ice, the ether layer was separated, washed with 5% sodium bicarbonate solution, dried over sodium sulphate and concentrated. There were thus obtained 66.2 g. of 1,18-di-[2,6,6-trimethyl-cyclohexen-(1)-yl]-3,7,12,16 - tetramethyl - 8,11 - dihydroxy - octadecahexaen - (2,4,6,12,14,16)-yne-(9).

5.6 g. of 1,18-di[2,6,6-trimethyl-cyclohexen-(1)-yl]-3,7,12,16 - tetramethyl - 8,11 - dihydroxy - octadecahexaen - (2,4,6,12,14,16)-yne-(9) were dissolved in 100 ml. of N-ethyl morpholine, and to the obtained solution there was added a solution of 1.3 g. of lithium-aluminium hydride in 30 ml. of absolute ether at 10–15° C., while stirring. The reaction solution was heated at 45° C. for 5 hours and then worked up in the manner described in Example 1. There was thus obtained 7,7-dihydro-β-carotene of M. P. 183–184° C.

*Example 3*

By condensing 8 g. of 8-[2,6,6-trimethyl-cyclohexadien-(1,3)-yl]-2,6-dimethyl-octatrien - (2,4,6) - al - (1) with an acetylene di-magnesium bromide solution prepared from 1.6 g. of magnesium, 11 g. of hexyl bromide, 33 ml. of ether and acetylene, and working up the condensation product in the manner described in Example 1, there were obtained 8.7 g. of crude 1,18-di-[2,6,6-trimethyl-cyclohexadien - (1,3) - yl] - 3,7,12,16 - tetramethyl - 8,11 - dihydroxy-octadecahexaen-(2,4,6,12,14,16)-yne - (9) which showed an absorption maximum in the U. V. spectrum at 285 mµ (in petroleum ether).

The product obtained according to the foregoing paragraph was dissolved in 200 ml. of absolute ether, and to the obtained solution there were gradually added 1.6 g. of lithium-aluminium hydride in 44 ml. of dry ether at 5–10° C., while stirring. The reaction solution was stirred for 24 hours in a nitrogen atmosphere at room temperature. By working up the reaction mixture in the manner described in Example 1 there were obtained 4 g. of 3,4-3,4-bisdehydro-7,7-dihydro-β-carotene in the form of orange-colored crystals; M. P. 174–175° C.; U. V. absorption maxima at 385, 405 and 430 mµ in petroleum ether.

*Example 4*

By reacting 10 g. of 8-[2,6,6-trimethyl-cyclohexen-(2)-yliden]-2,6-dimethyl-octatrien-(2,4,6)-al-(1) with a lithium acetylide solution prepared from 0.3 g. of lithium, 150 ml. of liquid ammonia and acetylene, and working up the reaction product in the manner described in Example 2, there were obtained 11.2 g. of crude 10-[2,6,6-trimethyl - cyclohexen - (2) - yliden] - 4,8 - dimethyl - decatrien-(4,6,8)-yne-(1)-ol-(3). This product can be purified by distribution between petroleum ether and 90% methanol and chromatography; U. V. absorption maximum at 350 mµ (in petroleum ether).

By condensing 7.5 g. of 10-[2,6,6-trimethyl-cyclohexen-(2) - yliden] - 4,8 - dimethyl - decatrien - (4,6,8) - yne - (1)-ol-(3) with 7 g. of 8-[2,6,6-trimethyl-cyclohexen-(2)-yliden]-2,6-dimethyl-octatrien-(2,4,6)-al-(1) and working up the condensation product as described in Example 2, there was obtained 1,18-di-[2,6,6-trimethyl-cyclohexen-(2) - yliden] - 3,7,12,16 - tetramethyl - 8,11 - dihydroxy - octadecahexaen-(2,4,6,12,14,16)-yne-(9) having an absorption maximum in the U. V. spectrum at 349.5 mµ (in petroleum ether).

By treating 16 g. of 1,18-di-[2,6,6-trimethyl-cyclohexen-(2) - yliden] - 3,7,12,16 - tetramethyl - 8,11 - dihydroxy - octadecahexaen-(2,4,6,12,14,16) - yne - (9) with lithium-aluminium hydride and working up the reaction product in the manner described in Example 1, there was obtained 4,4-dehydro-β-carotene in the form of violet crystals from methylene chloride-methanol; M. P. 191–193° C; U. V. absorption maxima at 446, 472 and 503 mµ (in petroleum ether).

*Example 5*

By condensing 3.2 g. of 10-[2,6,6-trimethyl-cyclohexen-(1) - yl] - 4,8 - dimethyl - decatrien - (4,6,8) - yne - (1) - ol-(3) (prepared according to Example 2) with 3 g. of 8 - [2,6,6 - trimethyl - cyclohexadien - (1,3) - yl] - 2,6 - dimethyl-octatrien-(2,4,6)-al-(1) and working up the condensation product as described in Example 2, there were obtained 6.2 g. of 1-[2,6,6-trimethyl-cyclohexen-(1)-yl]-18 - [2,6,6 - trimethyl - cyclohexadien - (1,3) - yl] - 3,7,12,16 - tetramethyl - 8,11 - dihydroxy - octadecahexaen - (2,4,6,12,14,16)-yne-(9) having an absorption maximum in the U. V. spectrum at 282.5 mµ (in petroleum ether).

By treating the product obtained according to the foregoing paragraph with lithium-aluminium hydride and working up the reaction product in the manner described in Example 1, there were obtained 3.5 g. of 3,4-dehydro-7,7-dihydro-β-carotene in the form of orange-colored crystals from methylene chloride-methanol; M. P. 178–179° C.; U. V. absorption maxima at 384, 405 and 430 mµ in petroleum ether.

*Example 6*

By condensing 35 g. of 10-[2,6,6-trimethyl-cyclohexen-(1)-yl] - 4,8-dimethyl-decatrien - (4,6,8)-yne-(1)-ol-(3) (prepared according to Example 2) with 32.5 g. of 8-[2,6,6-trimethyl-cyclohexen-(2)-yliden] - 2,6-dimethyl-octatrien-(2,4,6)-al-(1) and working up the condensation product in the manner described in Example 2, there were obtained 67 g. of crude 1-[2,6,6-trimethyl-cyclohexen-(1)-yl]-18-[2,6,6-trimethyl-cyclohexen-(2)-yliden]-3,7,12,16-tetramethyl - 8,11 - dihydroxy-octadecahexaen-(2,4,6,12,14,16)-yne-(9). This product can be purified by distribution between solvents or by chromatography. It shows U. V. absorption maxima at 282 and 351 mµ (in petroleum ether).

By treating the product obtained according to the foregoing paragraph with lithium-aluminium hydride and working up the reaction product in the manner described in Example 3, there was obtained the asymmetric isocarotene, 1-[2,6,6-trimethyl-cyclohexen-(1)-yl]-18-[2,6,6-trimethyl-cyclohexen-(2)-yliden] - 3,7,12,16-tetramethyl-octadecaoctaen-(2,4,6,8,10,12,14,16) in the form of violet crystals from methylene chloride-acetone; M. P. 162–163° C.; U. V. absorption maxima at 418, 444 and 472 mµ (in petroleum ether).

We claim:

1. A process which comprises condensing acetylene by means of metal-organic reactions through one of its reactive hydrogen atoms with an aldehyde selected from the group consisting of 8-[2,6,6-trimethyl-cyclohexen-(1)-yl]-2,6-dimethyl-octatrien - (2,4,6)-al-(1), 8-[2,6,6-trimethyl-cyclohexadien - (1,3)-yl] - 2,6-dimethyl-octatrien-(2,4,6)-al-(1), 8,[2,6,6-trimethyl-cyclohexylidene]-2,6-dimethyl-octatrien-(2,4,6)-al-(1), 8-[2,6,6-trimethyl-cyclohexen-(2)-yliden] - 2,6-dimethyl-octatrien - (2,4,6)-al-(1) and 2,6,10,14-tetramethyl-pentadecapentaen-(2,4,6,8,13)-al-(1), and through the other of its reactive hydrogen atoms with an aldehyde also selected from the aforesaid group, thereby forming a $C_{40}$-9-yne-8,11-diol; and treating the latter with excess lithium aluminum hydride, thereby converting the 9-yne-8,11-diol grouping to a conjugated diene grouping and forming a $C_{40}$ carotenoid.

2. A process which comprises treating 1-Q-18-T-3,7,12,16-tetramethyl - 2,4,6,12,14,16 - octadecahexaen-9-yne-8,11-diol, wherein the symbol Q represents a radical selected from the group consisting of 2,6,6-trimethyl-cyclohexen-(1)-yl, 2,6,6-trimethyl-cyclohexadien - (1,3)-yl, 2,6,6-trimethyl-cyclohexylidene, 2,6,6-trimethyl-cyclohexen-(2)-ylidene and 2,6-dimethyl-hepten-(5)-ylidene, and T also represents a radical selected from the aforesaid group, with excess lithium aluminum hydride, thereby converting the 9-yne-8,11-diol grouping to a conjugated diene grouping and forming a $C_{40}$ carotenoid.

3. A process according to claim 2 wherein at least one of the symbols Q and T represents 2,6,6-trimethyl-cyclohexen-(1)-yl.

4. A process according to claim 2 wherein at least one of the symbols Q and T represents 2,6,6-trimethyl-cyclohexadien-(1,3)-yl.

5. A process according to claim 2 wherein at least one of the symbols Q and T represents 2,6,6-trimethyl-cyclohexylidene.

6. A process according to claim 2 wherein at least one of the symbols Q and T represents 2,6,6-trimethyl-cyclohexen (2)-ylidene.

7. A process which comprises treating 1,18-di[2,6,6-trimethyl-cyclohexen - (1) - yl] - 3,7,12,16-tetramethyl-2,4,6,12,14,16-octadecahexaen-9-yne-8,11-diol with excess lithium aluminum hydride, thereby converting the 9-yne-8,11-diol grouping to a conjugated diene grouping and forming 7,7-dehydro-$\beta$-carotene.

8. A process which comprises treating 1,18-di[2,6,6-trimethyl-cyclohexadien - (1,3) - yl]-3,7,12,16-tetramethyl-2,4,6,12,14,16-octadecahexaen-9-yne-8,11-diol with excess lithium aluminum hydride, thereby converting the 9-yne-8,11-diol grouping to a conjugated diene grouping and forming 3,4-3,4-bisdehydro-7,7-dihydro-$\beta$-carotene.

9. A process which comprises treating 1,18-di[2,6,6-trimethyl-cyclohexen-(2)-ylidene] - 3,7,12,16-tetramethyl-2,4,6,12,14,16-octadecahexaen-9-yne - 8,11 - diol with excess lithium aluminum hydride, thereby converting the 9-yne-8,11-diol grouping to a conjugated diene grouping and forming 4,4-dehydro-$\beta$-carotene.

10. A process which comprises treating 1-[2,6,6-trimethyl-cyclohexen-(1)-yl] - 18 - [2,6,6-trimethyl-cyclohexadien-(1,3)-yl]-3,7,12,16-tetramethyl - 2,4,6,12,14,16-octadecahexaen-9-yne-8,11-diol with excess lithium aluminum hydride, thereby converting the 9-yne-8,11-diol grouping to a conjugated diene grouping and forming 3,4-dehydro-7,7-dihydro-$\beta$-carotene.

11. A process which comprises treating 1-[2,6,6-trimethylcyclohexen-(1) - yl] - 18 - [2,6,6-trimethyl-cyclohexen-(2)-ylidene] - 3,7,12,16 - tetramethyl - 2,4,6,12,14,16-octadecahexaen-9-yne-8,11-diol with excess lithium aluminum hydride, thereby converting the 9-yne-8,11-diol grouping to a conjugated diene grouping and forming 1-[2,6,6-trimethyl-cyclohexen-(1)-yl] - 18 - [2,6-dimethyl-cyclohexen - (2) - ylidene] - 3,7,12,16 - tetramethyl-2,4,6,8,10,12,14,16-octadecaoctaene.

12. 3,4-3,4-bisdehydro-7,7-dihydro-$\beta$-carotene.

13. 3,4-dehydro-7,7-dihydro-$\beta$-carotene.

14. 1-[2,6,6-trimethyl-cyclohexen - (1) - yl]-18-[2,6,6-trimethyl-cyclohexen-(2)-ylidene] - 3,7,12,16-tetramethyl-2,4,6,8,10,12,14,16-octadecaoctaene.

References Cited in the file of this patent

UNITED STATES PATENTS 2,671,112    Inhoffen et al.     Mar. 2, 1954